United States Patent
Servin et al.

(10) Patent No.: US 10,570,727 B2
(45) Date of Patent: *Feb. 25, 2020

(54) DATA PROCESSING SYSTEM FOR MAPPING FRACTURE LENGTH USING DOWNHOLE GROUND PENETRATING RADAR

(71) Applicant: SAUDI ARABIAN OIL COMPANY, Dhahran (SA)

(72) Inventors: Jesus Manuel Felix Servin, Dhahran (SA); Erika Shoemaker Ellis, Dhahran (SA); Ersan Turkoglu, Dhahran (SA); Howard Khan Schmidt, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/394,893

(22) Filed: Apr. 25, 2019

(65) Prior Publication Data

US 2019/0249546 A1 Aug. 15, 2019

Related U.S. Application Data

(62) Division of application No. 15/891,890, filed on Feb. 8, 2018.

(51) Int. Cl.
*E21B 47/12* (2012.01)
*G01S 13/90* (2006.01)
(Continued)

(52) U.S. Cl.
CPC ........ *E21B 47/122* (2013.01); *G01S 13/9017* (2013.01); *G01V 3/12* (2013.01);
(Continued)

(58) Field of Classification Search
CPC ........ E21B 47/122; E21B 43/26; E21B 49/00; G01S 13/9017; G01S 13/885; G01V 3/12; G01V 3/30

See application file for complete search history.

(56) References Cited

U.S. PATENT DOCUMENTS

| 4,814,768 A | 3/1989 | Chang |
| 6,556,014 B1 | 4/2003 | Kong |

(Continued)

OTHER PUBLICATIONS

International Search Report and Written Opinion for related PCT application PCT/US2019/017011 dated May 17, 2019.
(Continued)

*Primary Examiner* — Franklin D Balseca
(74) *Attorney, Agent, or Firm* — Bracewell LLP; Constance G. Rhebergen; Albert B. Kimball, Jr.

(57) ABSTRACT

Ground penetrating radar (GPR) measurements from a downhole well tool in a wellbore are obtained to identify length of fractures adjacent the wellbore. A ground penetrating radar transmitter of the downhole tool emits an electromagnetic pulse. The electromagnetic wave of the ground penetrating radar is diffracted on encountering an end or tip of a fracture, which acts as a secondary source. The diffracted signal is then collected by downhole receiver(s) of the downhole tool. Length of the fracture is determined based on the time of travel of the electromagnetic wave from its emission until its collection as a diffracted signal by the downhole receiver(s).

6 Claims, 10 Drawing Sheets

(51) Int. Cl.
*G01V 3/12* (2006.01)
*G01V 3/30* (2006.01)
*G01S 13/88* (2006.01)
*E21B 43/26* (2006.01)
*E21B 49/00* (2006.01)

(52) U.S. Cl.
CPC ............... *G01V 3/30* (2013.01); *E21B 43/26* (2013.01); *E21B 49/00* (2013.01); *G01S 13/885* (2013.01)

(56) References Cited

U.S. PATENT DOCUMENTS

| | | | |
|---|---|---|---|
| 7,167,124 | B2 | 1/2007 | Annan et al. |
| 7,424,911 | B2 * | 9/2008 | McCarthy ............... C09K 8/805 |
| | | | 166/250.12 |
| 7,646,334 | B1 | 1/2010 | Chow et al. |
| 8,096,355 | B2 | 1/2012 | McDaniel et al. |
| 8,354,939 | B2 | 1/2013 | McDaniel et al. |
| 8,680,865 | B2 | 3/2014 | Zhang et al. |
| 9,261,620 | B2 | 2/2016 | Mangione et al. |
| 9,664,816 | B2 * | 5/2017 | Donderici ............... E21B 43/26 |
| 2005/0062665 | A1 | 3/2005 | Du Toit et al. |
| 2009/0166030 | A1 * | 7/2009 | Zhuravlev ............... E21B 43/26 |
| | | | 166/250.1 |
| 2016/0017702 | A1 | 1/2016 | Koscheev et al. |
| 2016/0281498 | A1 | 9/2016 | Nguyen |
| 2016/0320518 | A1 | 11/2016 | Mangione |
| 2017/0019525 | A1 | 1/2017 | Hannon |

OTHER PUBLICATIONS

Samuel, R., et al, "Design and Development of Aqueous Colloidal Gas Aphrons for Enhanced Oil Recovery Application", SPE15418, Eighteenth SPE Improved Oil Recovery Symposium, Tulsa, OK, Apr. 14-18, 2012, pp. 1-8.

Tsoflias, G., et al, "GPR imaging of Dual-Porosity Rocks: Insights to Fluid Flow", The University of Lawrence, KS, The Leading Edge, Nov. 2008, pp. 1436-1445.

Tsoflias, G., et al, "Ground-Penetrating-Radar Response to Fracture-Fluid Salinity: Why Lower Frequencies are Favorable for Resolving Salinity Changes, Geophysics", vol. 73, No. 5 (Sep.-Oct. 2008); p. J25-J30, 8 FIGS. 10.11901/1.2957893.

* cited by examiner

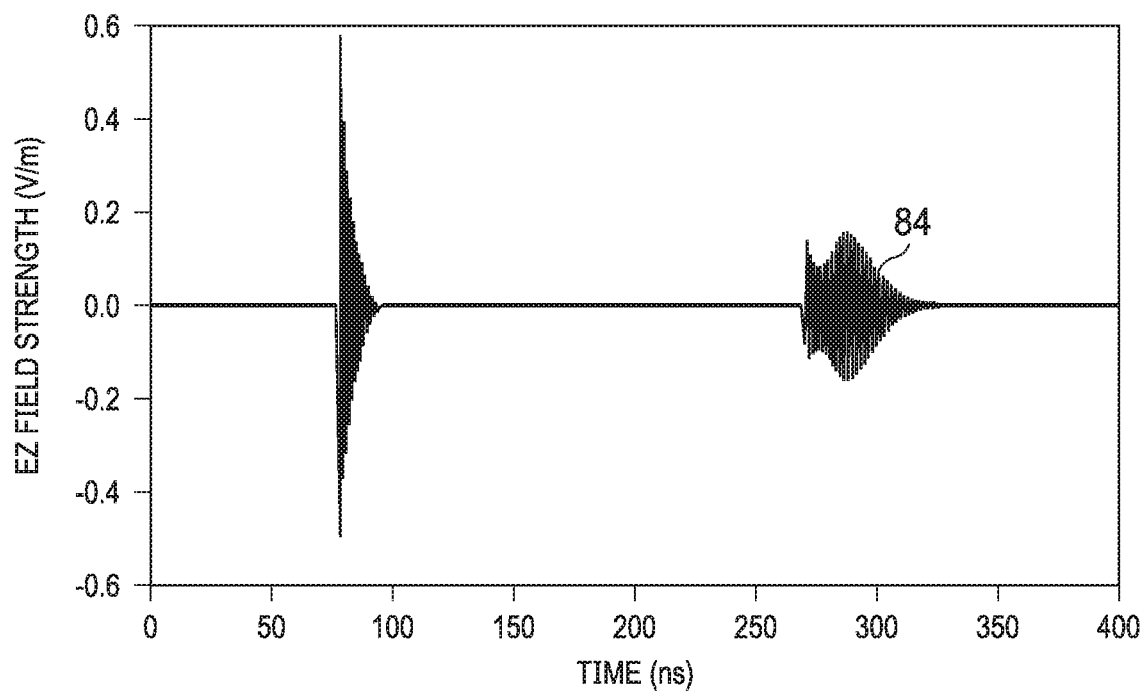
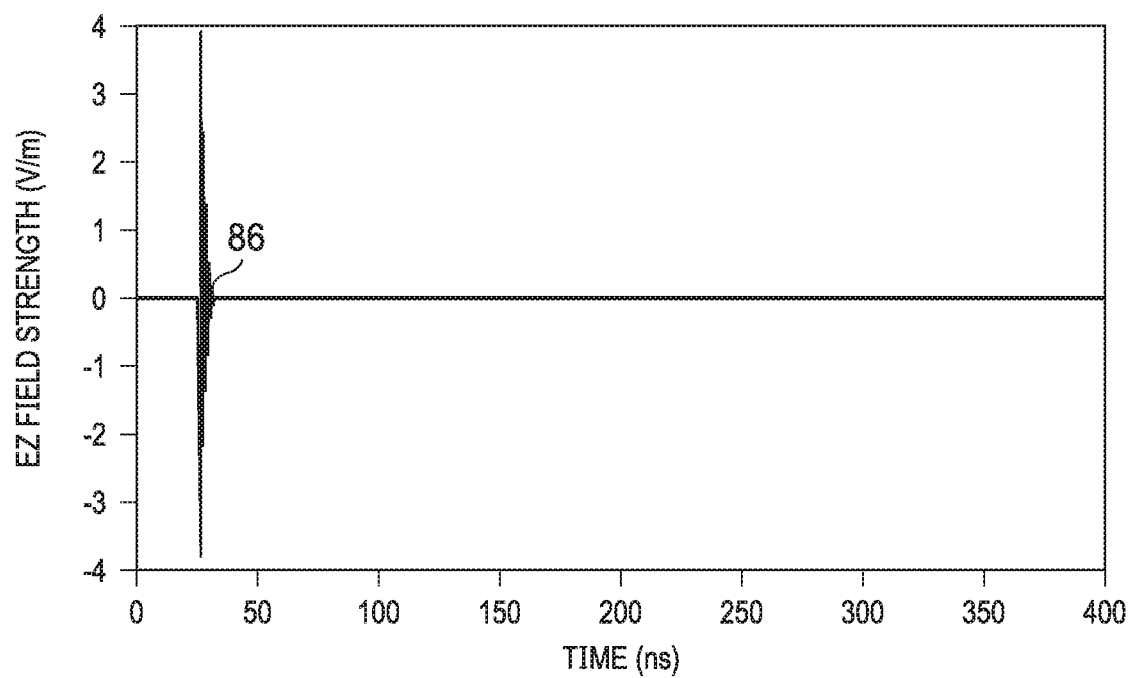

DATA PROCESSING SYSTEM FOR MAPPING FRACTURE LENGTH USING DOWNHOLE GROUND PENETRATING RADAR

CROSS-REFERENCE TO RELATED APPLICATIONS

This application is a divisional of, and claims priority for the filing date of, commonly owned, co-pending U.S. patent application Ser. No. 15/891,890. "Mapping Fracture Length Using Downhole Ground Penetrating Radar," filed on Feb. 8, 2018.

The present application is also related to commonly owned U.S. patent application Ser. No. 16/394,741, filed of even date herewith, entitled "Apparatus For Mapping Fracture Length Using Downhole Ground Penetrating Radar," and having the same inventor as the present application.

BACKGROUND OF THE INVENTION

1. Field of the Invention

The present invention relates to geophysical exploration, and more particularly to mapping the length of fractures in subsurface reservoirs based on measures obtained from ground penetrating radar systems located in well boreholes in areas of interest.

2. Description of the Related Art

Unconventional reservoirs are becoming an increasingly important source of oil and gas for the world. Unconventional reservoirs are those that require special recovery operations outside the conventional operating practices. Unconventional reservoirs may be of several types. Among these several types are reservoirs those containing what are known as tight-gas sands, and also reservoirs containing gas and oil shales. One of the challenges to develop gas and oil shale reservoirs is their low formation permeability. Current strategy to produce these reservoirs is by inducing hydraulic fractures to increase permeability and achieve economic production rates. It is therefore important to be able to characterize fracture length and orientation.

There have been several methods used for characterizing fracture length and orientation. A method known as microseismic monitoring is a method which has been most often used. Microseismic monitoring relied on acoustic events that occurred when the formation rock was being fractured. Typically, microseismic monitoring sensors had to be placed at the surface, or in nearby wells, because the acoustic environment in the wellbore of the fracture well which was being stimulated was too noisy. Aside from acoustic environmental noise, other considerations that determined the success of a microseismic survey included: seismogenic potential, which was dependent mainly on the properties of the formation; and detection capability, which was dependent on the sensors used and on parameters which affected signal propagation.

Microseismic surveys required nearby monitoring wells (typically within hundreds of meters) for the monitoring to be performed. Otherwise, the data could only be collected at the surface when the formation was relatively shallow (~10.000 ft.). For deeper formations and in the absence of nearby wells, microseismic surveys were of minimal value. This was due to the fact that the microseismic signal resulting from fracturing was attenuated along its path to the surface. The result was that the microseismic signal was not distinguishable from the acoustic environment noise.

Other problems with microseismic monitoring included, among others, uncertainty in the velocity model; microseismic signal frequencies higher than 200 Hz were hard to achieve; raypath polarizations; and uncertainties in arrival times of the observed input data. The foregoing problems and limitations, together with the high costs associated with the operation posed a significant limitation to the deployment of the microseismic monitoring on a large scale.

So far as is known, other fracture characterization methods also had disadvantages. The disadvantages were in general one or more of the following: being limited in effectiveness to shallow reservoirs; involving complex data interpretation processes; requiring that nearby monitoring wells be present; and being affected by environmental acoustic noise.

More specifically, fracture characterization for investigating fracture length by pseudo three dimensional (P3D) fracture propagation models did not measure fracture length, but rather formed estimates with values which varied greatly depending on the model used. Well testing to investigate fracture length also produced results which varied based on starting assumptions, and well test data prior to fracturing was often not available. Tiltmeters for investigating fracture length were expensive, difficult to operate and difficult to interpret.

Fracture characterization for investigating fracture height with pseudo three dimensional fracture propagation models and with tiltmeters had like disadvantages to those when investigating fracture length. Temperature and tracer logging to investigate fracture height were limited by shallow depths of penetration, providing results only near the wellbore of the fracture well. Temperature logs were also difficult to interpret in the field. Stress profiling to investigate fracture height required in-situ stress tests for calibration, and did not directly measure the fracture.

Fracture azimuth characterization with pseudo three dimensional fracture propagation models and with tiltmeters had like disadvantages to those when investigating fracture length or height. Core techniques for fracture azimuth characterization were expensive due to costs of obtaining core samples, and multiple tests were required for accuracy. Log techniques for fracture azimuth characterization required the presence of natural fractures and that open hole logs be available from the fracture well.

SUMMARY OF THE INVENTION

Briefly, the present invention provides a new and improved method of determining location of end portions of a fracture in a subsurface formation penetrated by a well. Electromagnetic energy is emitted from a ground penetrating radar transmitter in the well at a depth of interest. The ground penetrating radar electromagnetic energy is sensed after emission with a radar receiver in the well at a distance from the ground penetrating radar transmitter. The time of receipt of the ground penetrating radar electromagnetic energy by the radar receiver is sensed. From the arrival time of the received electromagnetic energy, the location of end portions of the fracture in the subsurface formation is then determined.

BRIEF DESCRIPTION OF THE DRAWINGS

FIGS. 4, 5, 6, 7, 8 and 9 are plots of received radar signals as functions of time obtained according to the present invention during testing of the laboratory model of FIG. 3.

DETAILED DESCRIPTION OF THE
PREFERRED EMBODIMENTS

According to the present invention, a method is provided to mapping fracture length with downhole ground penetrating radar waves that eliminates the need for nearby monitoring wells and surface sensors. The present invention takes advantage of what is known in physics as the knife-edge effect. The knife-edge effect is based on the Huygens-Fresnel principle, which is that a well-defined obstruction to an electromagnetic wave acts as a secondary source of an electromagnetic wave. The obstruction acting as a secondary source creates a new electromagnetic wavefront appearing to emanate from the obstruction.

Figure 1:
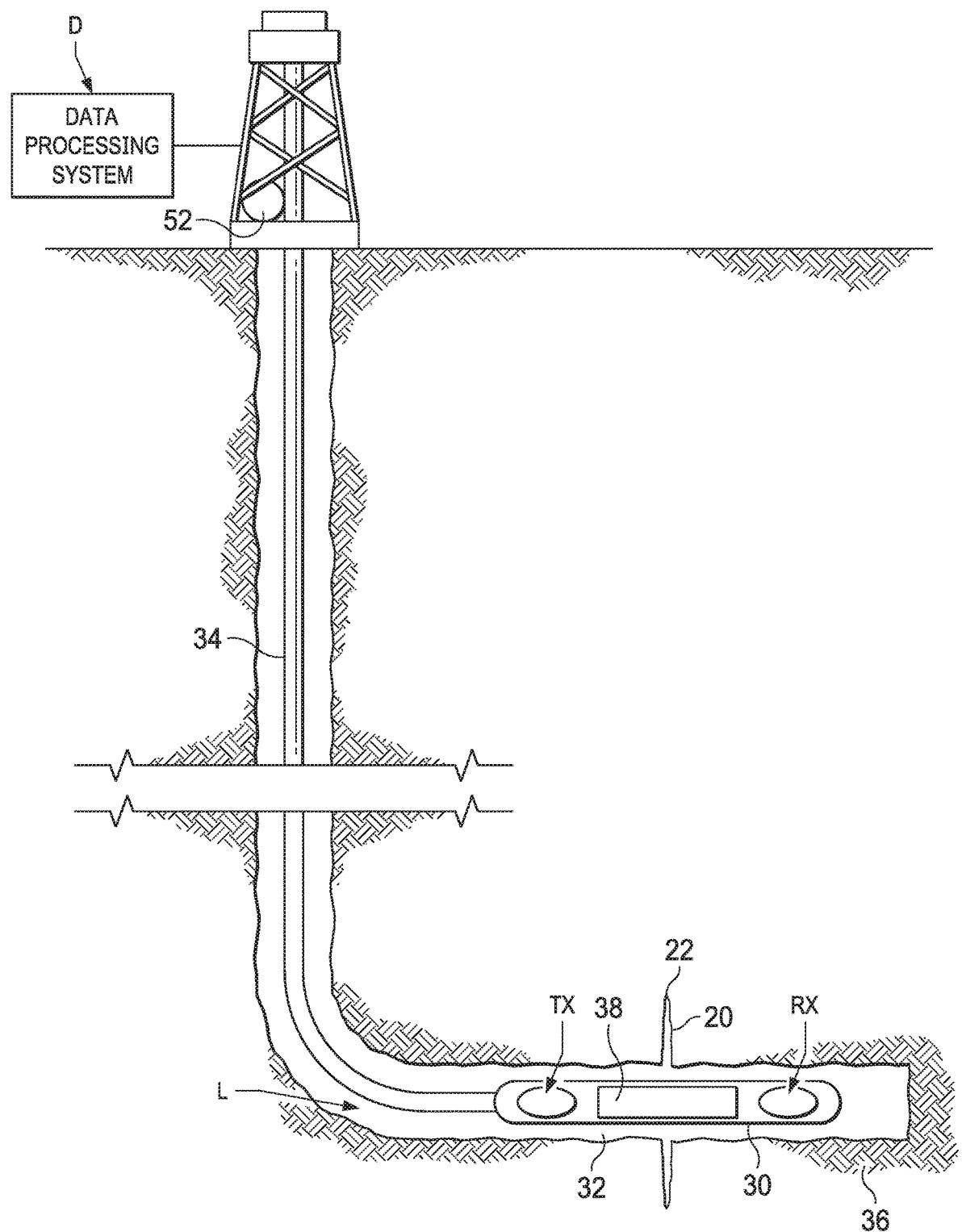
FIG. 1 is a schematic diagram, partly in cross-section, of a ground penetrating radar system according to the present invention deployed in a subsurface formation penetrated by a horizontal wellbore.

In the drawings, a ground penetrating radar well logging L is shown in FIG. 1. The ground penetrating radar well logging L includes a downhole ground penetrating radar Tx which emits when activated a pulse of electromagnetic wave energy that travels into the earth formation. A portion of the emitted pulse of electromagnetic wave energy travels directly from the transmitter Tx to the receiver Rx and is detected as a first break pulse having a first travel time. When there is a fracture 20 present in a subsurface formation in which the well logging tool is present, a portion of the emitted pulse of electromagnetic wave energy is diffracted by a tip 22 of fracture 20. The diffracted signal is then sensed by one or more downhole receiver(s) Rx. Length of the fracture 20 or distance to the tip 22 is then determined, as will be explained, from the travel time of the diffracted ground penetrating radar electromagnetic pulse sensed at the receiver(s) Rx.

The well logging tool L includes a sonde or housing body 30 which is suspended for movement in a wellbore 32 for movement by a wireline logging cable 34. The well logging tool T is moved in the wellbore 32 to well depths of interest in a formation 36 which is of interest for characterization of the length of fracture 20. As shown in FIG. 1, the wellbore 32 for an oil or gas shale formation 36 of an unconventional reservoir has transitioned from vertical near the earth surface to a generally horizontal plane by directional drilling.

Figure 14:
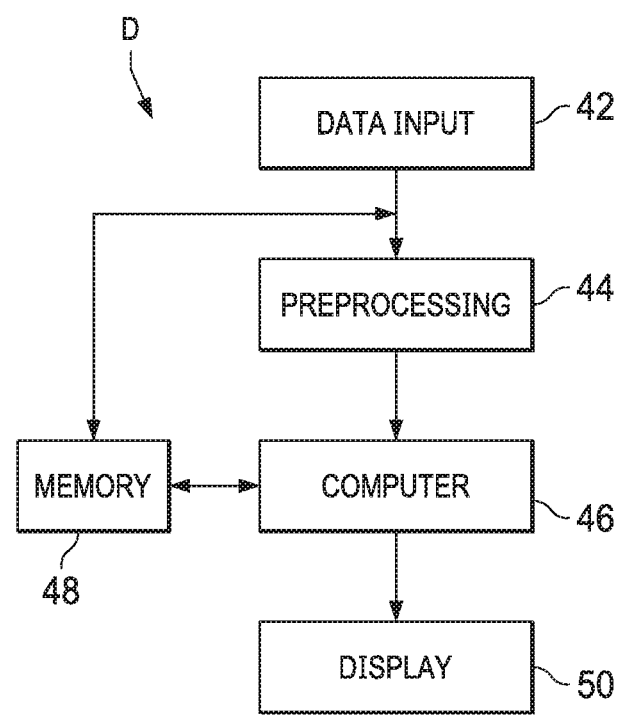
FIG. 14 is a schematic diagram of the data processing system of the ground penetrating radar system of FIG. 1.

Measures of travel time of the diffracted ground penetrating radar electromagnetic pulse sensed at the receiver(s) Rx of the downhole logging tool L are telemetered by a downhole telemetry system 38 in the downhole sonde 30 over the wireline logging cable 34 to an uphole telemetry and data processing system D (FIGS. 1 and 14). Travel time measurements from the logging tool are received by the uphole telemetry and data processing system D in a data input unit 42 as functions of borehole depth or length of extent in wellbore 32.

A preprocessing unit 44 and a processor computer 46 receive and process the measures of travel time of the diffracted ground penetrating radar electromagnetic pulses so that length of the fracture 20 present adjacent the wellbore 32 at a depth of interest may be determined. The determined fracture lengths at depths of interest are then stored or recorded in memory 48 and displayed by action of a display 50 in the desired manner, which is usually a plot of the parameters of interest as a function of depth at which they are determined within the wellbore 32.

A surface depth measurement system, such as a depth measure sheave wheel 52 and associated circuitry is provided to indicate depth of the logging tool L in the wellbore 32. The travel time data from the downhole subassembly 10 are recorded as functions of borehole depth in the data memory 48. Once recorded, the travel time measurements are transferred as needed into the preprocessing unit 44 and processor computer 46 of the data processing system D. The travel time measurements are after transfer subjected to conventional preprocessing in the preprocessing unit 44 and then transferred to computer 46. The processed data measurements in computer 46 are then available for processing to determine fracture length of fractures such as shown at 20 according to the present invention in a manner to be set forth below.

Figure 2:
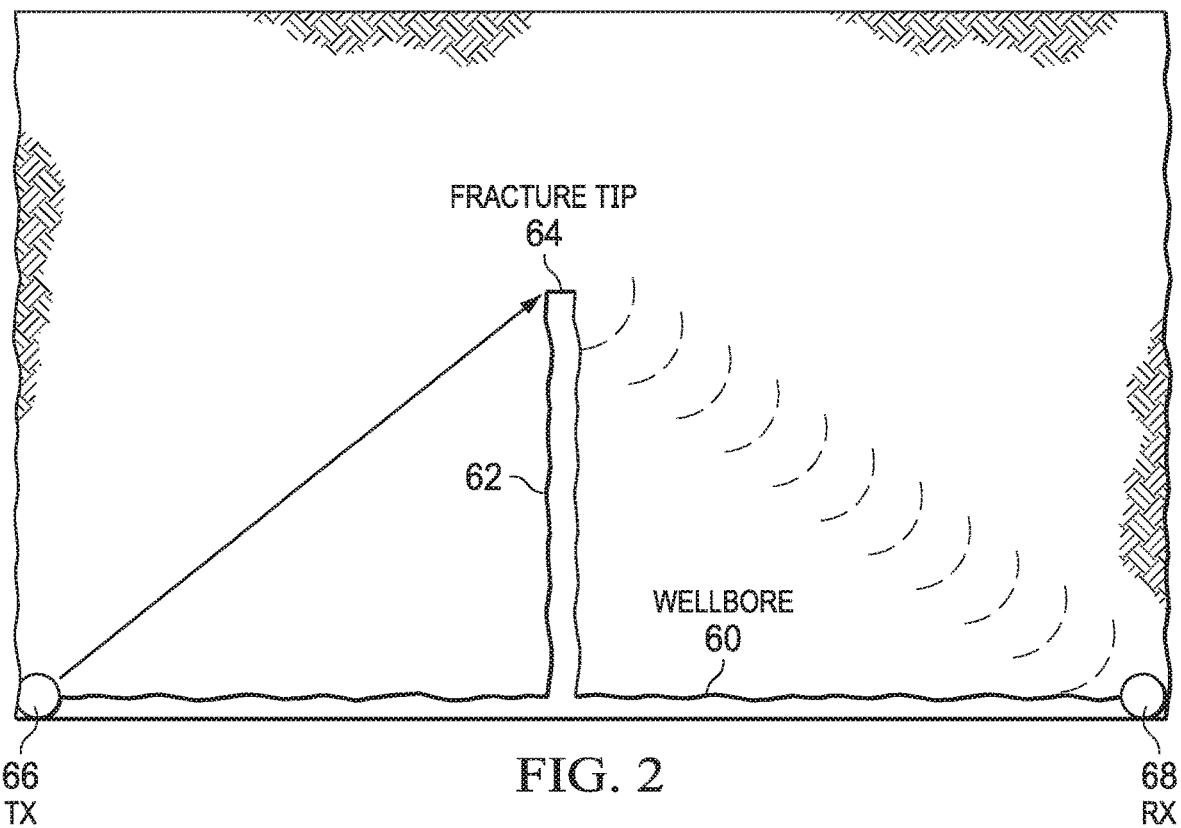
FIG. 2 is a schematic diagram of fracture length determination according to the present invention with the ground penetrating radar system of FIG. 1.

A series of numerical simulations were performed to demonstrate capabilities of the present invention. A numerical two-dimensional or 2-D model (FIGS. 2 and 3) was created representing a section of an unconventional reservoir), with a section of horizontal wellbore 60 and a fracture 62 that is perpendicular (FIG. 2) to the wellbore 60. The length of the fracture 62 to a tip 64 was configured in the numerical model to be variable to confirm the sensitivity of the present invention to the fracture length. A location 66 for transmitter Tx and a location 68 for receiver Rx were configured in the numerical model to be located inside the wellbore 60, spaced equidistant on either side of the fracture 62. The positions 66 and 68 of transmitter Tx and receiver Rx were moved for several different simulation scenarios to determine the effect of transmitter and receiver position on the received ground penetrating radar electromagnetic pulse signal.

Figure 3:
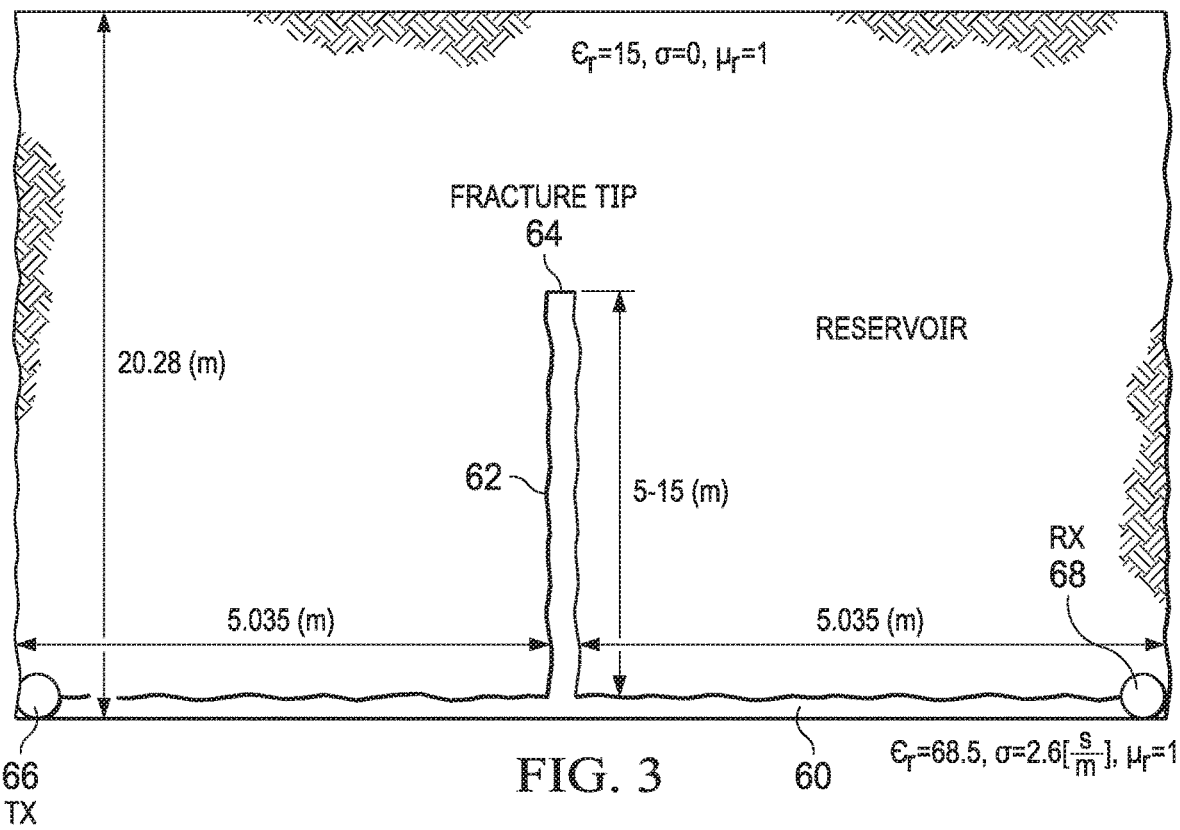
FIG. 3 is schematic diagram of a laboratory model used in test mapping of fracture length with a ground penetrating radar system according to the present invention.

In an initial test scenario (FIG. 3) for the numerical model, a 1 cm wide and 5 m long fracture 62 was simulated. The fracture was mapped according to the present invention using a 2 GHz electromagnetic pulse. The transmitter Tx location 66 and the receiver location 68 in the numerical model were 10 m apart from each other. Values for subsurface formation electromagnetic field parameters $\varepsilon_r$, $\sigma$, and $\mu_r$ in the numerical model are indicated in FIG. 3. An electromagnetic pulse was then generated at by numerical modeling at location 66 and its propagation was monitored in the numerical model.

Figure 4:
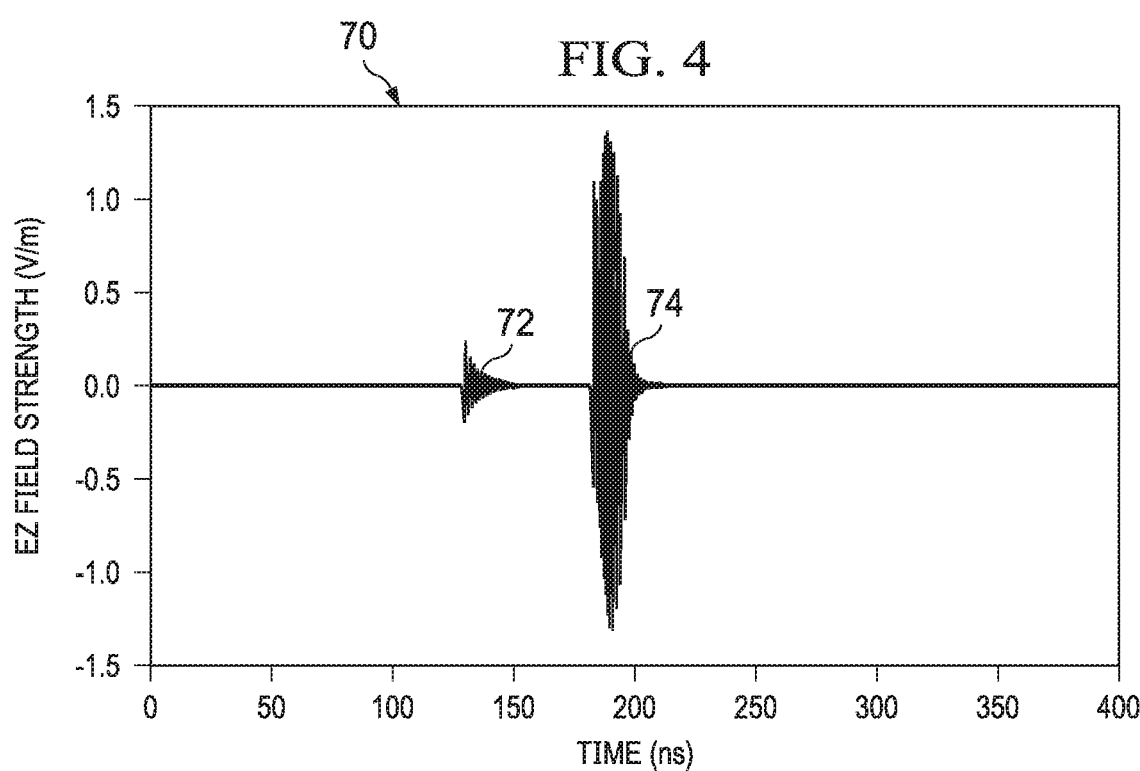

The received signal from numerical modeling is shown as a plot 70 in FIG. 4. The received signal plot 70 clearly indicates two signal breaks, a first signal break 72 at ~129 nanoseconds (ns) and a second break 74 at ~180 ns. The time when the first break 72 occurs correlates with the distance in the numerical model between transmitter location 66 and receiver location 68 (~10 m in this case), while the second break 74 correlates with the length of the path an emitted ground penetrating radar electromagnetic pulse would travel if it was being diffracted by a fracture tip as if it were a secondary behaving as described above with regard to FIG. 2.

Figure 5:
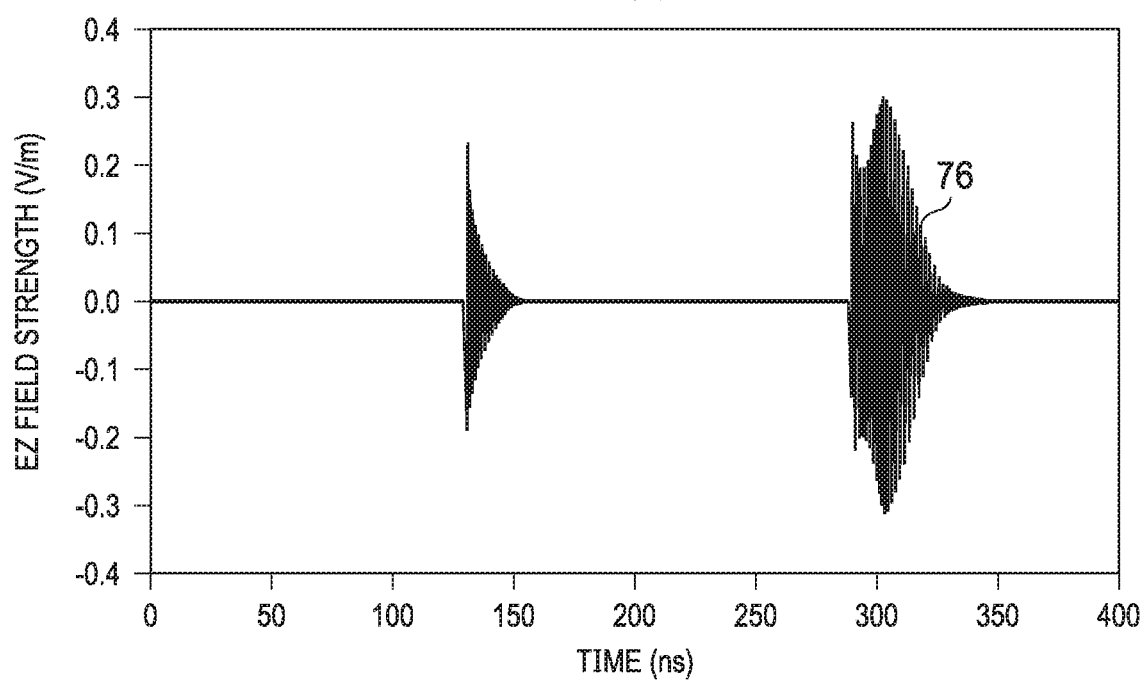
Figure 6:
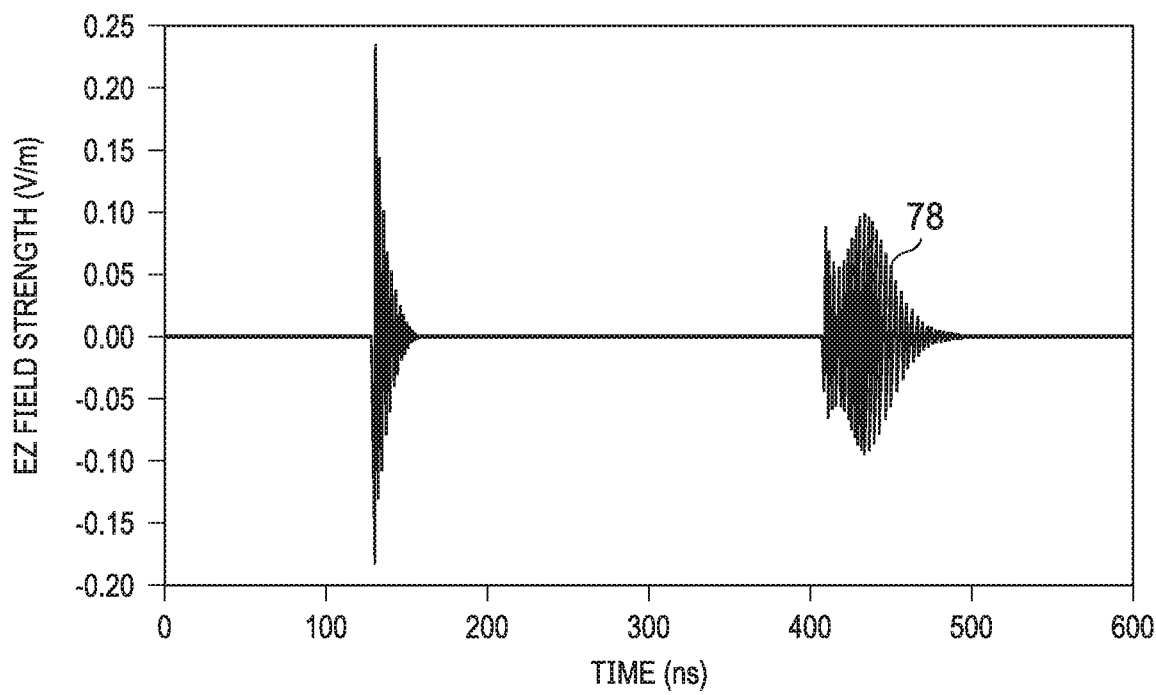

To confirm that the second break travel time corresponds to the fracture length, second and third numerical modeling scenarios were simulated with fracture 62 having lengths of 10 m and 15 m, respectively. The received second breaks 76 (FIG. 5) and 78 (FIG. 6) show that as fracture length increases, the time at which the second break occurs becomes greater (FIGS. 5 and 6). Further, the indications of travel time by second breaks 76 and 78 are in agreement with what it would be if the pulse was propagating as a result of secondary electromagnetic waves as illustrated schematically in FIG. 2. The results in FIGS. 4, 5 and 6 of numerical modeling simulations suggest that the fracture tip 62 is indeed acting as a secondary electromagnetic source. These results confirm that there is a relationship between the length of the fracture and the time at which the second break of the emitted ground penetrating radar electromagnetic wave pulse occurs.

To investigate whether the present invention methodology is sensitive at lower frequencies, the numerical modeling scenario for a 10 m long fracture was repeated but this time the pulse was centered at 100 MHz, rather than 2 GHz. Results are plotted in FIG. 7. The received signal clearly shows a first break 80 corresponding to the distance between transmitter and receiver, and a second break 82 related to the fracture length. A notable difference between using 2 GHz and 100 MHz, aside from the amplitude, is the lack of ringing in the 100 MHz signal. This is apparently explained by the fact that at 2 GHz the ground penetrating radar signal can in effect penetrate or see inside the fracture, while at 100 MHz the ground penetrating radar signal cannot penetrate or see inside the fracture because the wavelength at the lower 100 MHz frequency is not small enough. In both cases, however, the present invention is capable to determine the fracture length with ground penetrating radar.

A summary of the results obtained by numerical modeling and plotted in FIGS. 4, 5, 6 and 7 is contained in Table 1.

TABLE 1

| Fracture length (m) | Frequency (GHz) | Direct shot (ns) | Path length (m) | Calculated time (ns) | Simulation time (ns) |
|---|---|---|---|---|---|
| 5 | 2 | 129 | 14.1 | 180 | ~180 |
| 10 | 2 | 129 | 22.4 | 290 | ~290 |
| 10 | 0.1 | 129 | 22.4 | 290 | ~290 |
| 15 | 2 | 129 | 31.6 | 410 | ~410 |

Table 1 above shows that second breaks from these simulations are in accord with the time a second break should occur if indeed the tip of the fracture is acting as a secondary source. This indicates that the present invention can be used to estimate the length of a fracture that is perpendicular to the wellbore.

To demonstrate of the present invention, a further set of numerical simulations were performed. In the numerical simulations, the transmitter position 66 and receiver position 68 were located at different spacings from each other in the wellbore for a fixed fracture length (10 m) and with a 2 GHz ground penetrating radar pulse emitted. Initially, results were obtained with the transmitter position 66 and receiver position 68 located 10 m apart from each other in the numerical model, which is the configuration for the modeling depicted in FIG. 7. The results of numerical modeling of 10 m spacing are shown in the travel times displayed in FIG. 5.

For the second and third scenario of the further set, both the transmitter position 66 and receiver position 68 were moved closer to the fracture 60. First the transmitter position 66 and receiver position 68 were placed 3 m away from the fracture 60 on either side. The results of numerical modeling for 6 m spacing between the transmitter position 66 and receiver position 68 are shown in the travel times displayed in FIG. 8. The transmitter position 66 and receiver position 68 were then moved to 1 m away from the fracture 60 on either side. The results of numerical modeling of 2 m spacing between the transmitter position 66 and receiver position 68 are shown in the travel times displayed in FIG. 9. The received signals plotted in FIGS. 8 and 9 again show that the time when the second breaks 84 (FIG. 8) and 86 (FIG. 9) occur correlates with the length of the path the signal would have to travel if the fracture tip 64 is acting as a secondary source.

Table 2 presents a summary of the results obtained in the further set of simulations.

TABLE 2

| Fracture length (m) | Frequency (MHz) | Distance between Tx-Rx (m) | Direct shot (ns) | Path length (m) | Calculated time (ns) | Simulation time (ns) |
|---|---|---|---|---|---|---|
| 10 | 100 | 10 | 129 | 22.4 | 290 | ~290 |
| 10 | 100 | 6 | 77 | 20.9 | 270 | ~270 |
| 10 | 100 | 2 | 26 | 20.1 | 260 | ~260 |

Figure 7:
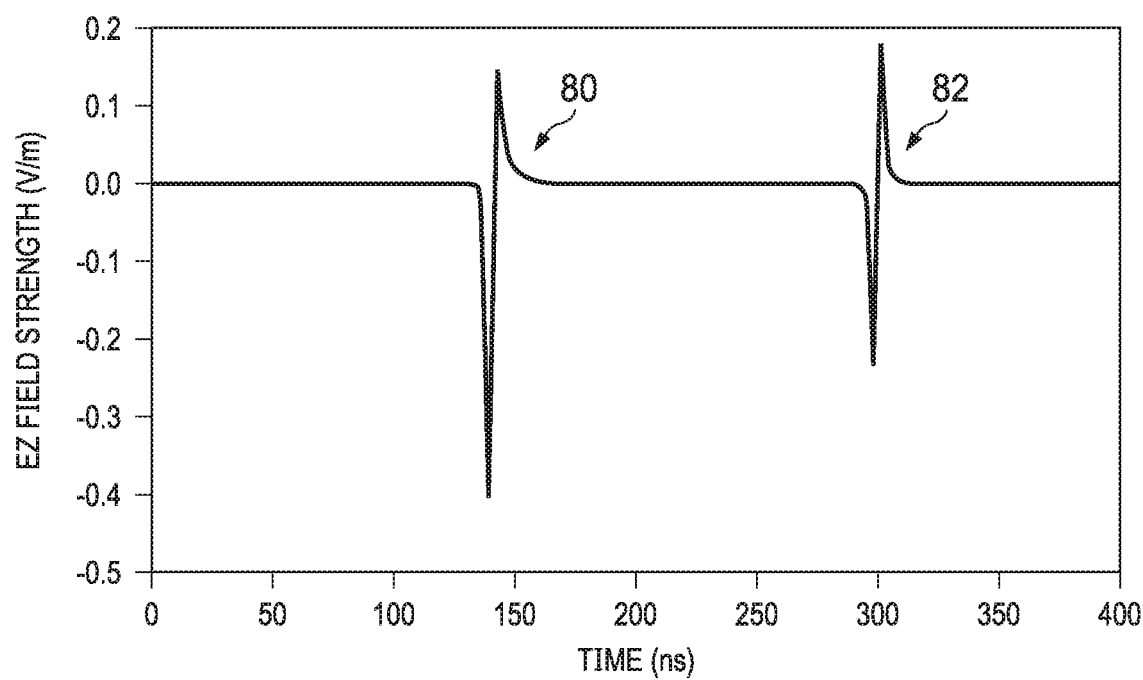

The numerical modeling results plotted in FIGS. 7, 8 and 9 and summarized in Table 2 indicate that the present invention is sensitive to spacing of ground penetrating radar transmitter and receiver position from the fracture.

Next, further numerical modeling simulations were performed to study the effect of ground penetrating radar frequency on the ability to map fractures with different lengths. Fractures with three different lengths (5 m, 10 m, and 15 m) were simulated and surveyed using 10 MHz and 100 MHz pulses for each of three different fracture lengths.

Figure 10A:
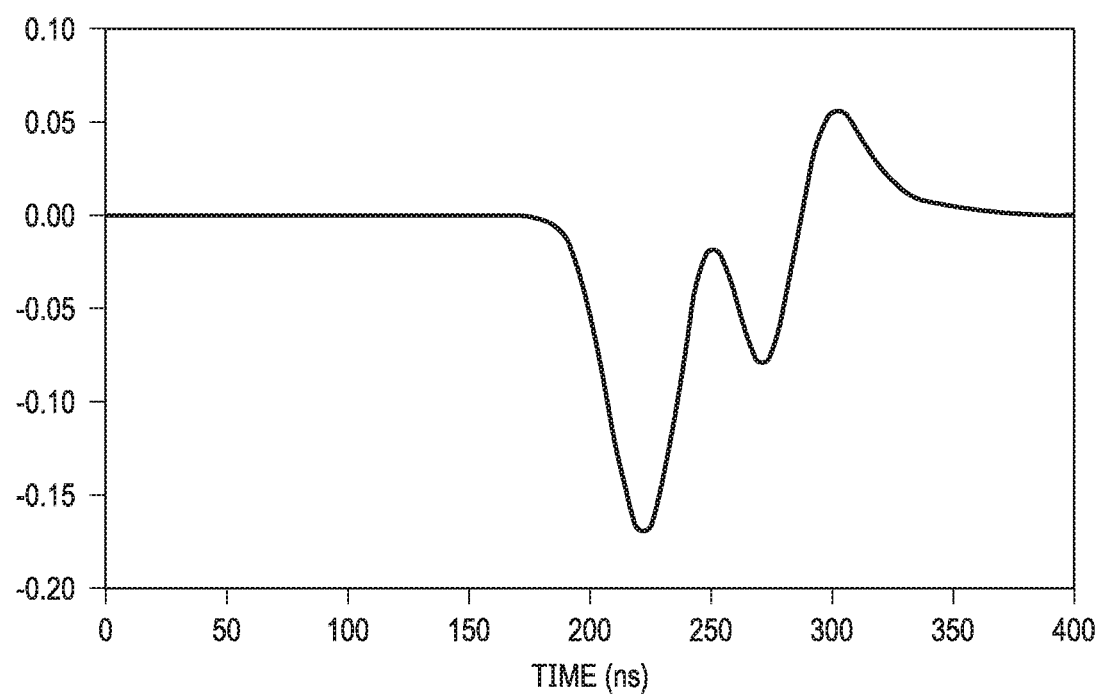
FIGS. 10A, 10B, 11A, 11B, 12A and 12B are comparative plots of mapped fractures of different lengths obtained according to the present invention during testing of the laboratory model of FIG. 3 for different ground penetrating radar frequencies.
Figure 10B:
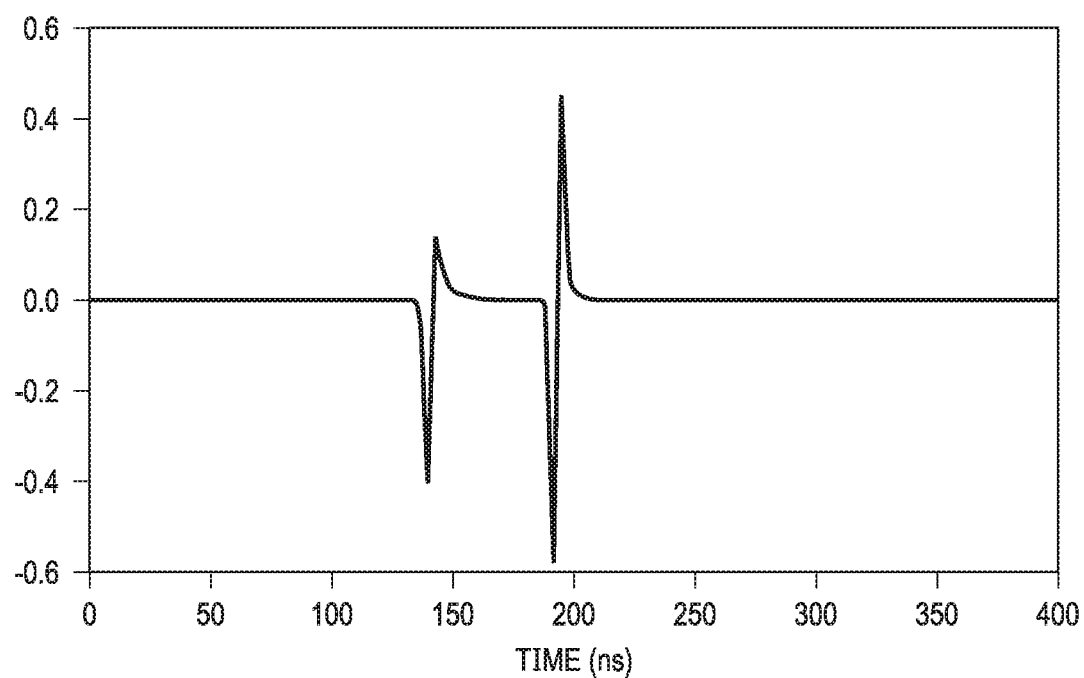
Figure 11A:
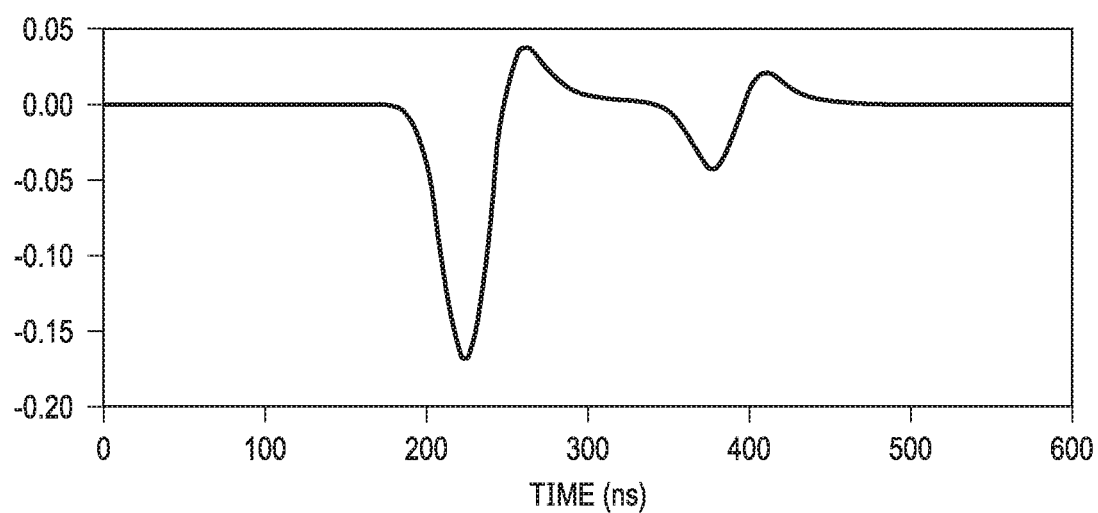
Figure 11B:
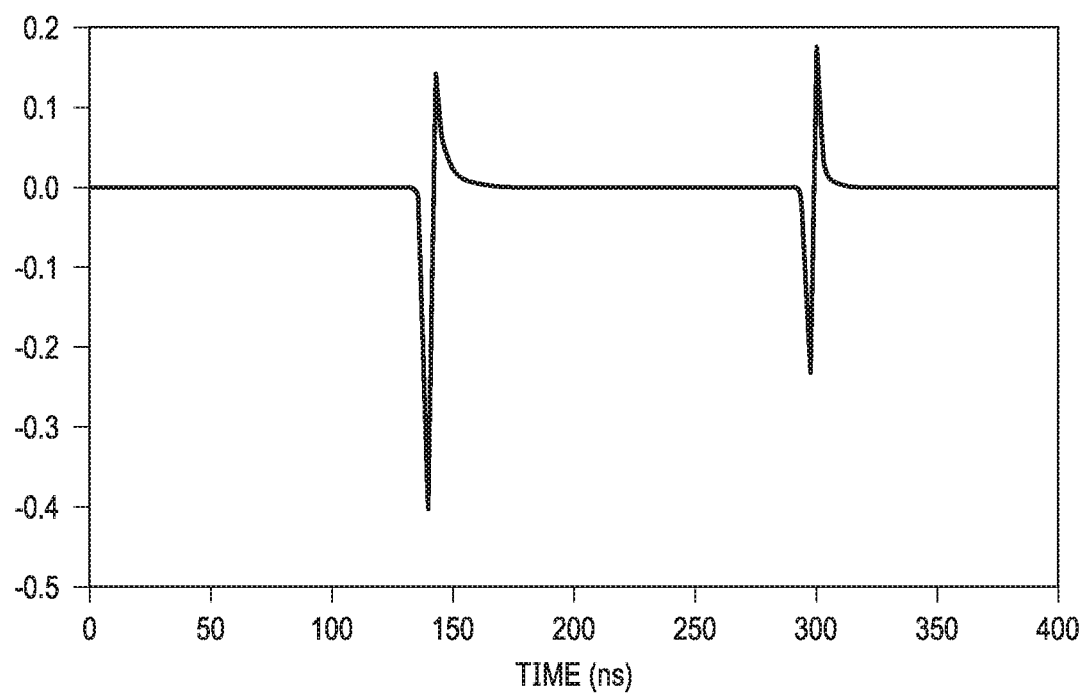
Figure 12A:
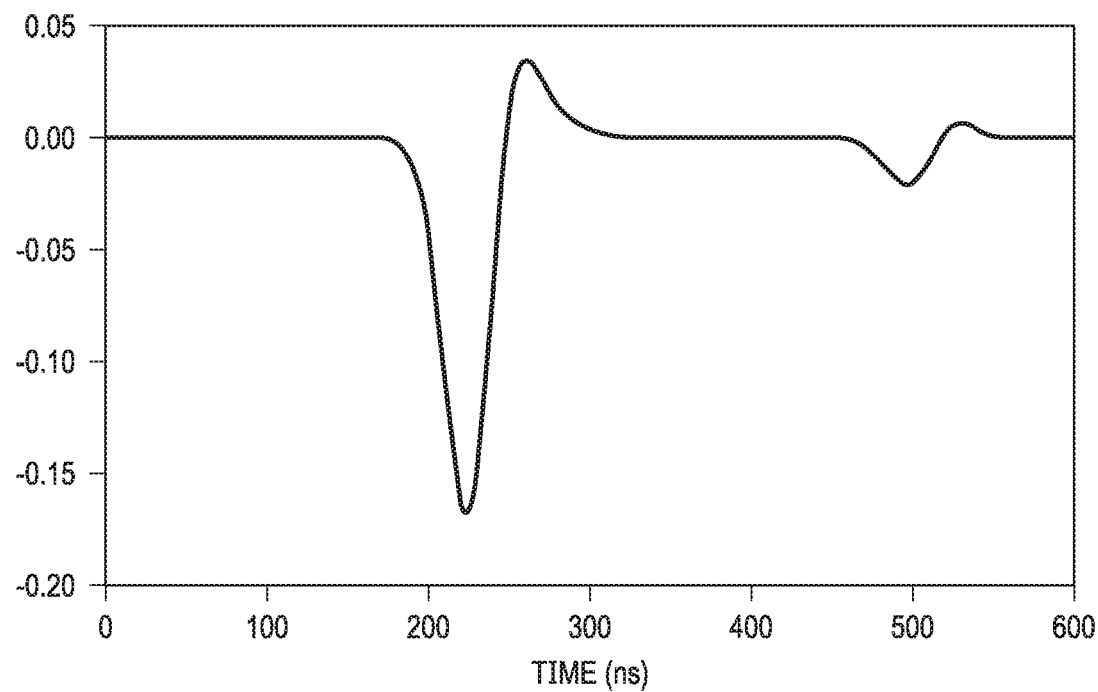
Figure 12B:
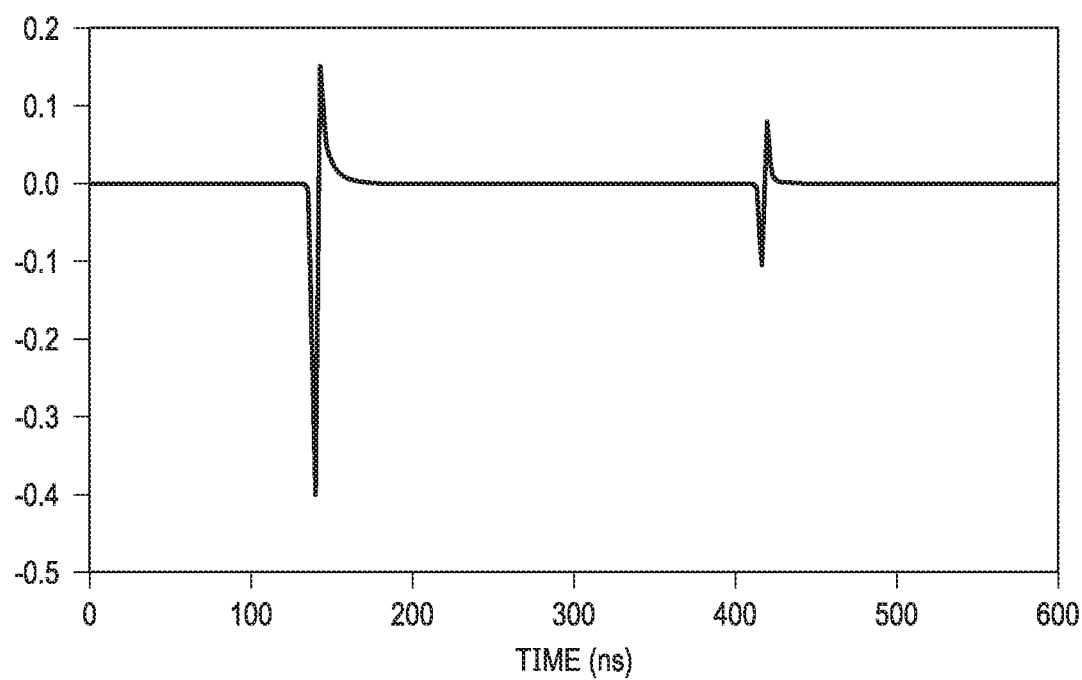

FIGS. 10A, 11A and 12A are plots of the numerical modeling of fractures mapped with ground penetrating radar emitting a pulse at 20 MHz and fracture lengths of 5 m, 10 m and 15 m, respectively. FIGS. 10B, 11B and 12B are plots of the numerical modeling of fractures mapped with ground penetrating radar emitting a pulse at 100 MHz and fracture lengths of 5 m, 10 m and 15 m, respectively.

The numerical modeling results plotted in FIGS. 10A through 12B show that the lower the ground penetrating radar frequency, the longer the fracture needs to be to be able to properly map its length. While lower ground penetrating radar frequencies offer increased penetration, a tradeoff between penetration and ability to map a fracture's length exists.

Figure 13A:
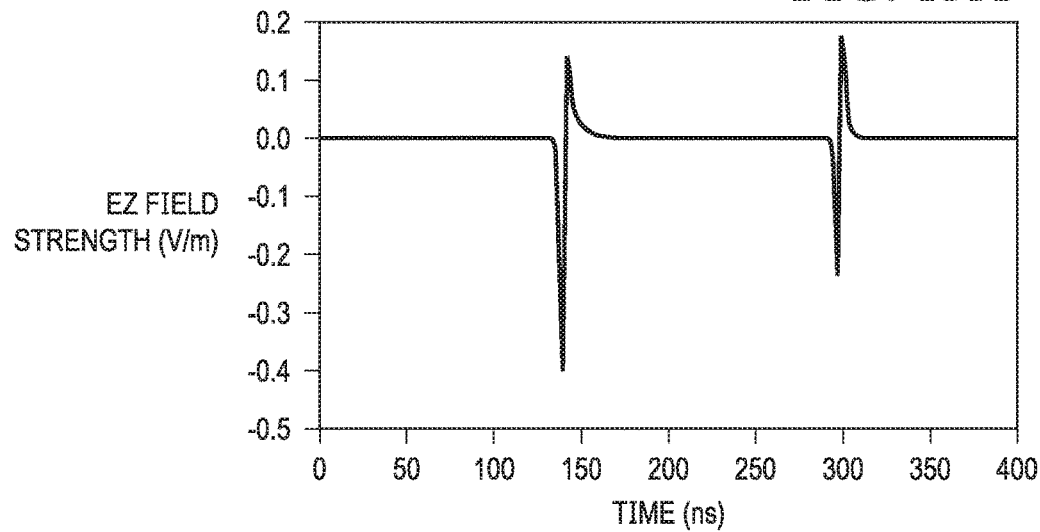
FIGS. 13A, 13B and 13C are comparative plots of mapped fractures obtained according to the present invention during testing of the laboratory model of FIG. 3 with different reservoir conductivities.
Figure 13B:
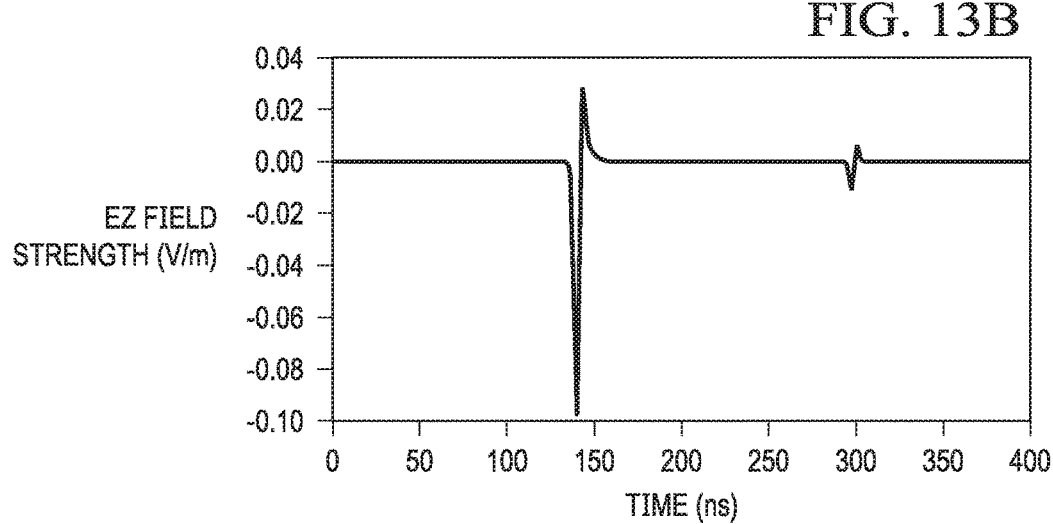
Figure 13C:
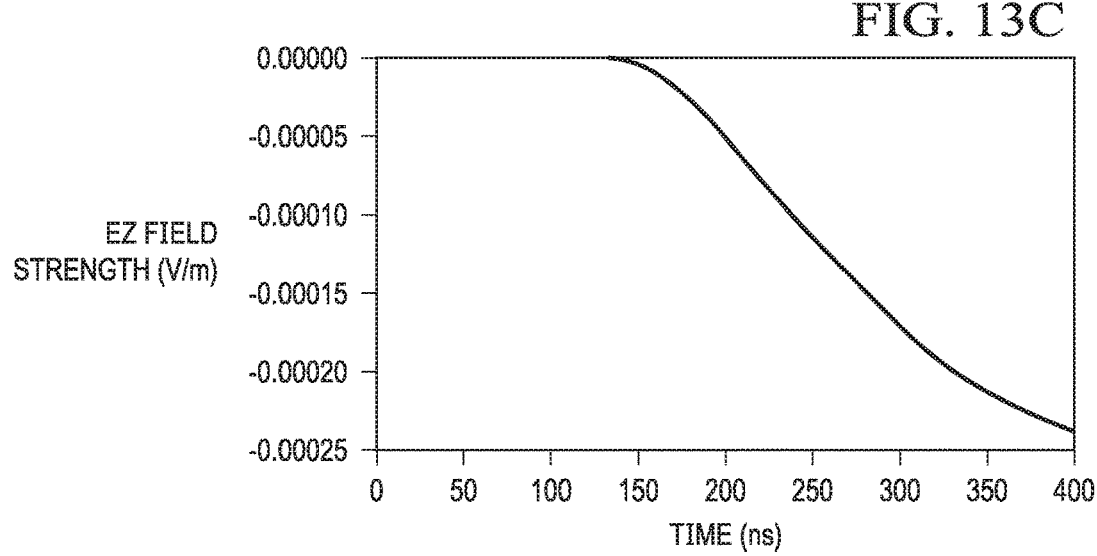

Additionally, the effect of the conductivity of the reservoir in the received signal was analyzed. FIGS. 13A, 13B and 13C are plots of numerical models of received ground penetrating radar pulses as a function of time for a fracture having a length of 10 m. FIG. 13A is plot of a received signal with reservoir conductivity assumed to have a zero value. FIG. 13B is plot of a received signal with a reservoir conductivity having a value of 0.003 S/m, or Siemens per meter. FIG. 13C is plot of a received signal with a reservoir conductivity having a value of 0.03 S/m. FIGS. 13A through 13C confirm that higher conductivity in a reservoir formation results in increased attenuation of the ground penetrating radar waves. Therefore the present invention is more preferably suited mapping fractures in low conductivity reservoir formation environments.

The present invention with ground penetrating radar electromagnetic waves offers advantages in contrast to prior seismic waves to map fractures, in addition to electromagnetic waves and seismic waves being different types of wave energy. The present invention does not require monitoring wells in proximity to the wellbore (typically within hundreds of meters for microseismic monitoring). The present invention is also less complicated because it does not require a receiver array at the surface, and the data is less complex to interpret. The present invention can be used for deep reservoirs as opposed to microseismic monitoring. As has been mentioned, microseismic monitoring is limited to shallow reservoirs (typically no deeper than 3 km) due to signal attenuation. The present invention is also not affected by acoustic noise. It can be seen that the present invention provides an improved method to map hydraulic fractures.

The invention has been sufficiently described so that a person with average knowledge in the field of reservoir modeling and simulation may reproduce and obtain the results mentioned herein described for the invention. Nonetheless, any skilled person in the field of technique, subject of the invention herein, may carry out modifications not described in the request herein, to apply these modifications to a determined structure and methodology, or in the use and practice thereof, requires the claimed matter in the following claims; such structures and processes shall be covered within the scope of the invention.

It should be noted and understood that there can be improvements and modifications made of the present invention described in detail above without departing from the spirit or scope of the invention as set forth in the accompanying claims.

What is claimed is:

1. A data processing system for determining location of end portions of a fracture in a subsurface formation penetrated by a well, comprising:

(a) an uphole telemetry system receiving, from a well logging tool in the well, an uphole signal comprising measures of sensed time of receipt of diffracted ground penetrating radar electromagnetic energy sensed by a radar receiver in the well logging tool after emission of electromagnetic energy by a ground penetrating radar electromagnetic energy transmitter in the well logging tool;

(b) the uphole telemetry system further receiving, from the uphole signal, sensed arrival of a first break pulse indicating spacing of the radar transmitter and radar receiver, and sensed arrival of a second break pulse indicating presence of a fracture as a secondary electromagnetic energy source; and (c) a processor computer processing the received uphole signal to determine, from the measures of the sensed time of receipt of the sensed electromagnetic energy, the location of end portions of the fracture in the subsurface formation.

2. The data processing system of claim 1, wherein the processor computer further determines the location of end portions of the fracture by determining the location of end portions of the fracture from an arrival time of the second break pulse.

3. The data processing system of claim 1 wherein the fracture in the formation is formed by fracturing the subsurface formation.

4. The data processing system of claim 1 wherein the well is formed by horizontal drilling of the subsurface formation.

5. The data processing system of claim 1 further including:
    a memory storing the determined location of end portions of the fracture in the subsurface formation.

6. The data processing system of claim 1 further including:
    an output display forming an image of the determined location of end portions of the fracture in the subsurface formation.

* * * * *